Jan. 3, 1933. G. A. ROBERTSHAW 1,892,810
AUTOMATIC FUEL CONTROLLER
Original Filed Nov. 1, 1927   3 Sheets-Sheet 1
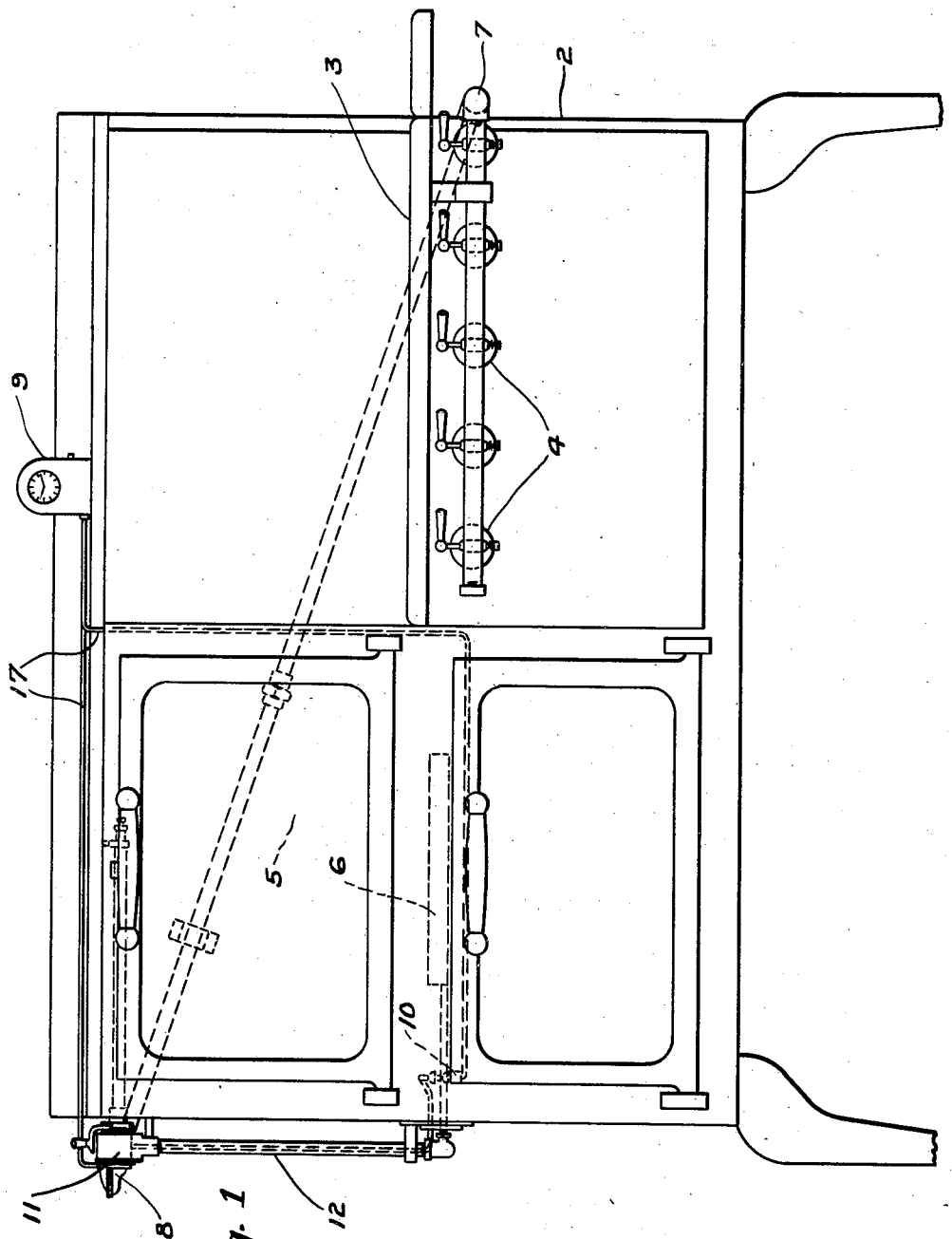
INVENTOR
George A. Robertshaw
By Byrnes, Stebbins & Parmelee,
His attorneys.

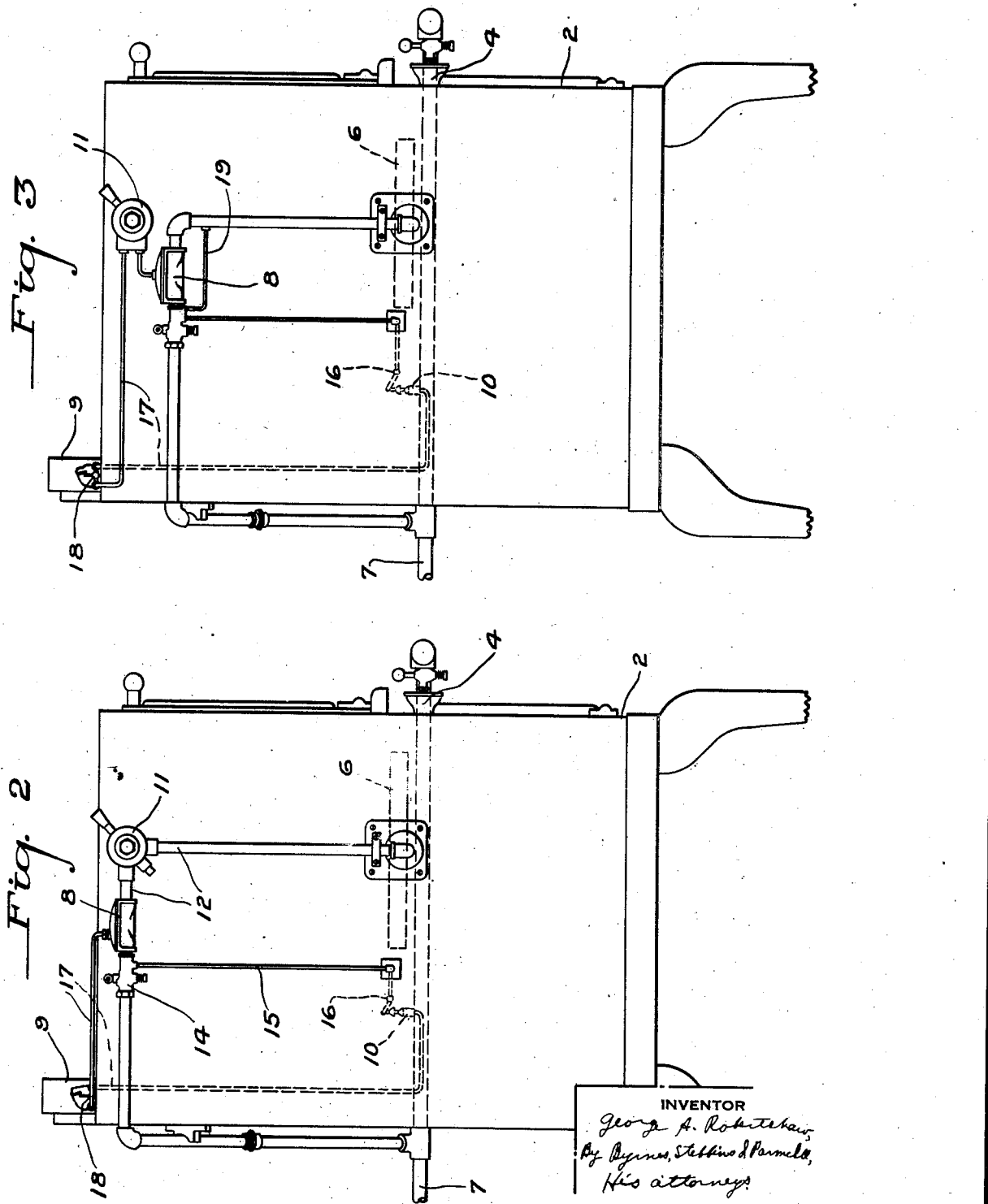

Jan. 3, 1933.    G. A. ROBERTSHAW    1,892,810
AUTOMATIC FUEL CONTROLLER
Original Filed Nov.1, 1927    3 Sheets-Sheet 3
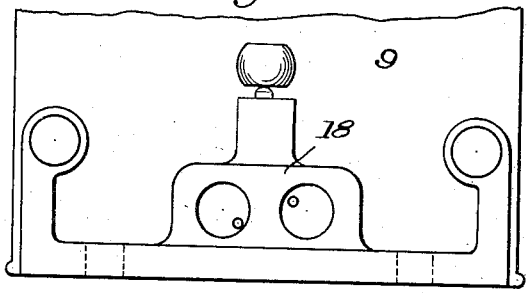
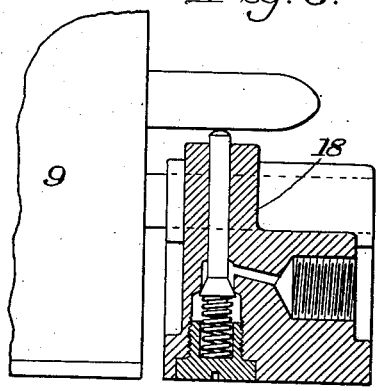
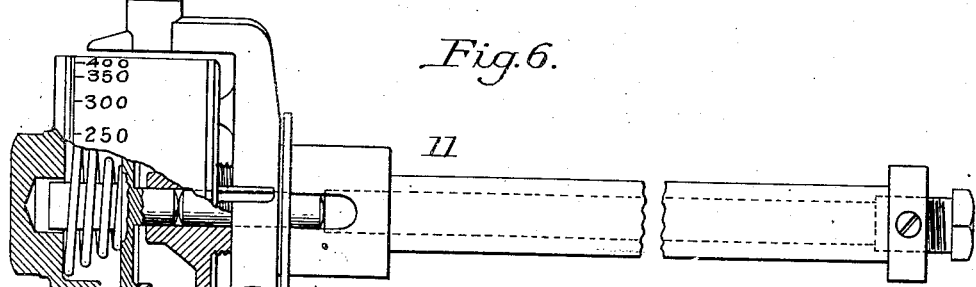
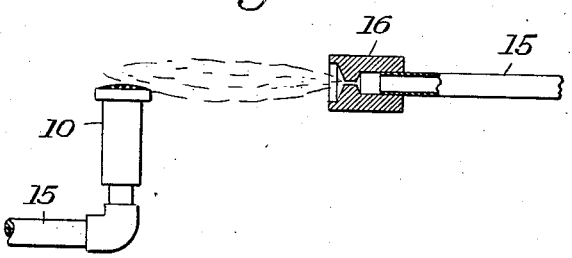
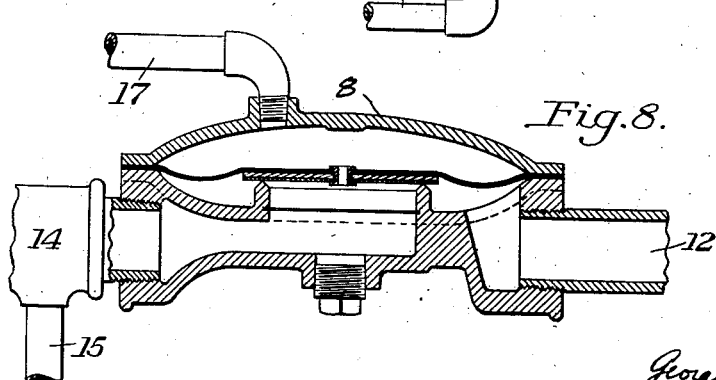
INVENTOR
George A. Robertshaw,
By Byrnes, Stebbins, Parmelee
and Blenko
his attys.

Patented Jan. 3, 1933

1,892,810

UNITED STATES PATENT OFFICE

GEORGE A. ROBERTSHAW, OF YOUNGWOOD, PENNSYLVANIA

AUTOMATIC FUEL CONTROLLER

Application filed November 1, 1927, Serial No. 230,323. Renewed April 1, 1931.

My invention relates to an automatic fuel controller, and particularly to an automatic system for controlling the operation of gas ovens, furnaces, and the like.

In operating ovens and small furnaces, it is often desirable that the oven shall be heated to a predetermined temperature during a particular portion of the day. The period at which the oven is heated may be such that it is inconvenient or undesirable for an operator to be present to start or stop the heating operation.

In cooking ranges a housewife frequently desires to put a roast, or the like, into an oven preparatory to leaving her home. The housewife knows approximately the length of time and heat required to cook the food in the oven, and also the time of her probable return, and desires to set the range so that it will automatically start and cook the food during her absence.

One of the objects of my invention is to provide a control system that may be preset to automatically start and complete a sequence of heating operations.

In practicing my invention a burner is preferably jointly controlled by a clock and a thermostat. The clock initiates the heating operation at a predetermined time and permits it to continue for a definite period before shutting off the supply of fuel to the burner. The clock may also control a definite sequence of heats in the oven. The thermostat controls the temperature of the oven during the heating or cooking operation. In applying a clock and thermostat to a gas burner it is also necessary that a pilot light be provided and that the fuel supply be cut off upon failure of the pilot light to function.

Accordingly, I provide a pressure operated valve for supplying fuel to the burner. The valve is operatively associated with a valve controlled by the clock and with a thermostatically controlled pilot light that also serves as a valve for creating a back pressure against the fuel valve. If either or both the clock or the thermostatic pilot light operates to extinguish the burner, a back pressure is built up that closes the fuel supply valve. When it is desired to light the burner, the clock and the pilot light relieve the pressure on the fuel valve, thereby permitting gas to enter the burner, which is lighted from another pilot light.

The accompanying drawings illustrate a present preferred embodiment of my invention and are not a limitation thereof, as various changes may be made therein without departing from the spirit of the invention or the scope of the appended claims.

In the drawings,—

Figure 1 is an elevational view of a gas range embodying my invention;

Figure 2 is an end view thereof showing the thermal control system;

Figure 3 is a similar view of a modified form of the invention;

Figure 4 is a view in side elevation of the back of a portion of the clock and clock-controlled valve;

Figure 5 is an enlarged view in side elevation and partly in section of the device illustrated in Figure 4;

Figure 6 is a view in side elevation and partly in cross section of the thermostatically controlled valve;

Figure 7 is a view in side elevation and partly in cross section of the thermostatic pilot burner and the pilot light; and Figure 8 is a view in cross section of the back pressure operated diaphragm valve.

Referring to Figures 1 and 2, a gas range 2 may be provided with a hot plate 3, portions of which are heated by burners 4, and an oven 5 heated by a burner 6. The burner 6 is supplied with fuel, such as gas, from a supply line 7 through a fuel valve 8. The valve 8 may be of the pressure-responsive type normally opened by the pressure of the gas from the supply line 7 and automatically closed by a back pressure within the valve itself. Such a valve is shown and described in the patent to Robertshaw, et al., No. 1,455,662, issued May 15, 1923. The valve 8 is controlled by a clock 9 and a thermostatic pilot burner 10.

The thermostatic pilot burner 10 comprises a casing having orifices for egress of gas to support a pilot flame. So long as the casing is hot the orifices remain open, but as soon as the burner 10 becomes cool a heat responsive element within the casing moves the casing so as to close the orifices, thereby shutting off the gas. If the burner 10 is burning or the pilot 16 is burning, the heat responsive element is heated and maintains the casing in such position that the orifices are open, but if both the burner 10 and the pilot 16 go out the heat responsive element cools and moves the casing to close the orifices.

A second thermostatically controlled valve 11 is disposed in a pipe line 12, connecting the burner 6 to the valve 8.

A manually operated valve 14 is provided for shutting off the supply of fuel from the pipe line 7 to the valve 8. A pipe line 15 connects the valve 14 to a pilot light 16 independently of the valve 8. The clock 9 is inserted in a pipe line 17, connecting the burner 10 to the valve 8.

The clock 9 may be of any preferred type capable of opening and closing a valve 18 contained therein at predetermined times. The clock may vary the periods of opening of the valve 18 through a predetermined sequence for developing different degrees of heat during different stages of cooking in the oven 5. The clock is provided with means permitting the manual operation of the valve 18 if desired. A number of clocks capable of such operation are now on the market, and therefore a detailed description thereof is omitted. Accordingly, the clock 9 and the burner 10, when both are open, may serve to permit the escape of gas from the upper portion of the valve 8 or, if either or both are closed, create a back pressure for closing the valve and extinguishing the burner 6.

In operating the oven 5, the thermostat 11 is set to control the desired temperature of the oven by increasing or decreasing the fuel supplied to the burner 6. The clock 9 is set to open the valve 18 at a predetermined time and to close it at another predetermined time corresponding to the time required to cook whatever food is placed in the oven 5. The manually operated valve 14 is opened and the pilot light 16 ignited.

At the proper time the clock 9 opens the valve 18 and permits the release of gas from the upper portion of the valve 8 to the burner 10. If the pilot light 16 has been lit a sufficient length of time to heat the thermostatic burner 10, the latter is open and permits the gas to escape into the oven after its ignition. If the pilot light 16 fails to function, the burner 10 remains closed, thereby maintaining the back pressure upon the upper portion of the valve 8. The release of the pressure from the valve 8 permits gas to traverse the thermostatically controlled valve 11 and the pipe line 12 to the burner 6 where it is ignited by the pilot light 16. The burner 6 heats the oven 5 sufficiently to cause the thermostatically controlled valve 11 to reduce the gas supplied thereto. Thereafter the supply of gas to the burner 6 is varied by the thermostatically controlled valve 11 in accordance with the fluctuations in the temperature of the oven 5. If a varying sequence of heat in the oven 5 is desired, the clock 9 partially opens or closes the valve 18 to vary the back pressure in the valve 8.

At the end of a predetermined period, corresponding to the time required to cook the food in the oven, the clock 9 closes the valve 18, thereby creating a back pressure in the valve 8 to extinguish the burner 6. If the pilot light 16 or the thermostatic burner 10 becomes extinguished, thereby cooling the latter sufficiently to close it, a back pressure is created on the valve 8 for extinguishing the burner 6.

If it is desired to operate the oven 5 directly under manual control, the mechanism of the clock 9 is freed from engagement with the valve 18. If desired, the valve 18 may be left in an open position and the valve controlled by the thermostatic burner 10, the thermostatically controlled valve 11 and the valve 14.

Referring to Figure 3, the thermostatically controlled valve 11 may be connected between the valve 8 and the clock 9 rather than in the pipe line 12 as in the form of the invention shown in Figure 2. In this form of the invention the thermostatically controlled valve 11 increases or decreases the pressure in the upper portion of the valve 8 rather than acting directly on the body of fuel admitted to the burner 6. The two forms of the invention are otherwise the same. If desired, the valve 8 may be equipped with a bypass 19 for supplying a minimum flame at the burner 6.

Therefore, I have provided a thermostatic control system for ovens characterized by the use of a clock and a pilot burner for controlling a valve supplying fuel to a main burner. The clock may be set to open the fuel valve at a predetermined time and to close it after the elapse of a definite interval of time. The clock may also control a predetermined sequence of oven heats. The fuel valve is further controlled by a thermostatic pilot burner that must be heated to a definite temperature before the main valve can open to admit fuel to the burner, thereby preventing any possibility of the fuel being supplied to the burner when the pilot light is extinguished.

While I have described my invention in connection with a cooking range, it is to be understood that it is applicable to other types of industrial furnaces, ovens, and burners, and that such uses are contemplated within the scope of the appended claims.

I claim:

1. The combination with a burner, of means for controlling the supply of fuel to the burner comprising a pressure operated valve, and a clock-controlled valve and a thermal-responsive device in series connection for releasing the pressure in the pressure operated valve to permit it to open when the clock-controlled valve and the thermal-responsive device are both in their open position and for creating a back pressure to close the pressure operated valve when either or both is in its closed position.

2. In a device of the character described, the combination of an oven, a main burner therefor, a primary thermostatically controlled valve for said main burner, a back pressure fuel valve controlling the flow of fuel to said primary thermostatic valve, means for operating said back pressure fuel valve comprising, a pilot light, a thermostatically controlled pilot burner supplied with fuel from the back pressure side of said fuel valve and heated by said pilot light, and a clock controlled valve controlling the flow of fuel to said pilot burner.

3. In combination, a main fuel burner, a conduit for conducting fuel to said main burner, a back pressure operated valve in series with said conduit for controlling the quantity of fuel admitted to said main burner, a pilot light supplied with fuel from said conduit, said pilot light being positioned so as to light said burner when fuel is supplied thereto, means for controlling said back pressure operated valve comprising a thermostatically controlled pilot burner supplied with fuel from the back pressure side of said back pressure operated valve and positioned so as to be bathed in the flames of the pilot light, and a clock controlled valve for starting and stopping the flow of fuel from the back pressure side of said back pressure operated valve to said pilot burner, substantially as described.

4. An oven provided with a burner, a conduit for supplying gas to the burner, a main valve in said conduit, auxiliary conduits leading from the main conduit and adapted to convey a portion only of the gas in the main conduit, a clock mechanism for controlling the flow of gas in the auxiliary conduits, and means dependent upon flow of gas in said auxiliary conduits for operating said main valve.

5. An oven provided with a burner, a main conduit for supplying gas to the burner, a main valve in said main conduit, an auxiliary conduit in communication with the main conduit and adapted to convey a portion only of the gas in the main conduit, and a clock mechanism for controlling the flow of gas in the auxiliary conduit, the operation of said main valve being dependent upon the flow of gas in said auxiliary conduit.

6. An oven provided with a burner, a main conduit for supplying gas to the burner, a main valve in said main conduit, an auxiliary conduit in communication with the main conduit and adapted to convey a portion only of the gas in the main conduit, a clock mechanism for controlling the flow of gas in the auxiliary conduit, a pilot light, and means operable in accordance with the flow of gas through said auxiliary conduit for operating said main valve, said means being inoperative when the pilot light is off.

In testimony whereof I have hereunto set my hand.

GEORGE A. ROBERTSHAW.